United States Patent
Hart

[19]

[11] Patent Number: 6,089,262
[45] Date of Patent: Jul. 18, 2000

[54] RETAINED SEAT CHECK VALVE

[75] Inventor: James E. Hart, Trafford, Pa.

[73] Assignee: Westinghouse Air Brake Company, Wilmerding, Pa.

[21] Appl. No.: 09/326,048

[22] Filed: Jun. 4, 1999

[51] Int. Cl.[7] .................................................. F16K 15/00
[52] U.S. Cl. .................. 137/543.21; 137/543.19
[58] Field of Search .................. 137/543.21, 543.19, 137/540; 251/368

[56] References Cited

U.S. PATENT DOCUMENTS

| | | | |
|---|---|---|---|
| 466,838 | 1/1892 | Shaddick | 137/543.21 |
| 3,145,724 | 8/1964 | Pelzer | 137/543.21 |
| 3,154,096 | 10/1964 | Bell | 137/543.21 |
| 3,195,567 | 7/1965 | Cummings | 137/543.21 |
| 4,428,464 | 1/1984 | Miura | 137/543.19 |
| 4,961,449 | 10/1990 | Demeautis et al. | 137/543.19 |
| 5,092,361 | 3/1992 | Masuyama et al. | 137/543.21 |
| 5,546,981 | 8/1996 | Li et al. | 137/543.21 |

FOREIGN PATENT DOCUMENTS

| | | | |
|---|---|---|---|
| 705063 | 11/1951 | United Kingdom | 137/543.21 |

Primary Examiner—Gregory L. Huson
Assistant Examiner—Joanne Y. Kim
Attorney, Agent, or Firm—James Ray & Associates

[57] ABSTRACT

A unique, inexpensive and easily manufactured check valve device features a valve housing, a valve seat, a resilient ring seal, a retaining sleeve, a valve member and a valve spring. The valve housing defines an inlet channel, an outlet channel and at least one valve bore through which the inlet and outlet channels interconnect. Formed in the valve bore is the valve seat. The valve seat has a generally flat annular surface from within which an opening emerges into a preferred one of the two channels. The resilient ring seal is situated atop, and is coaxial with the opening defined by, the flat annular surface of the valve seat. Situated within the valve bore, the retaining sleeve serves to retain the resilient ring seal by its periphery against the flat annular surface of the valve seat. The valve member is moveable within the retaining sleeve. By its head portion at one end, the valve member is adapted to be pressed against, and form a leak-proof seal with, the resilient ring seal. Compressively disposed within the valve bore against a non-seat facing side of the valve member, the valve spring compels the head portion of the valve member against the resilient ring seal. The check valve device is thus normally biased in a closed position wherein the preferred channel is cut-off from the valve bore of the valve housing.

20 Claims, 5 Drawing Sheets

RETAINED SEAT CHECK VALVE

FIELD OF THE INVENTION

The invention generally relates to check or poppet type valves that are commonly employed in many of the pneumatically or electropneumatically based systems currently in use in the railroad industry. More particularly, the invention pertains to a type of check or poppet valve whose design employs a resilient or soft ring seal as part of the valve seat against which a relatively hard valve member seats when the valve device is biased to or otherwise placed in the closed position.

BACKGROUND OF THE INVENTION

Examples of the types of systems in the railroad industry to which the invention may be applied include air drying systems or air brake control systems such as those produced and sold by the Westinghouse Air Brake Company (WABCO).

Representative of the type of environment to which the invention may be applied is the twin tower air drying system disclosed in U.S. Pat. No. 5,715,621. This twin tower air drying system is capable of providing a continuous stream of cleaned and dried compressed air to any of the various types of air brake control systems manufactured by WABCO. As shown in FIG. 3 of that patent, the twin tower system features two air drying assemblies (each containing a desiccant cartridge), two inlet check valves, two outlet check valves, two purge check valves and a control mechanism that coordinates operation of the check valves according to a preset operating cycle.

Whether used in air drying systems, brake control systems or other types of pneumatic apparatus, check and poppet type valve devices of varying design are used to establish, cutoff, or otherwise manipulate the flow of air in the systems in which they are employed. As shown in FIG. 1, one type of prior art check valve device is comprised of a valve element 1, a valve spring 2 and a valve seat 3, all of which accommodated within a chamber 4 defined in the housing of the valve device. The housing of the valve device also typically defines an inlet channel and an outlet channel by which the valve device pneumatically connects to or within the pneumatic system with which it is used. The valve chamber 4 is composed of one or more contiguous bores drilled into or otherwise formed in the valve housing. It is through this valve chamber 4 that the inlet and outlet channels interconnect.

Referring still to the basic features of the check type valve device of FIG. 1, the valve seat 3 features a surface 30 within which is defined an opening from which one of the channels emerges. The surface 30 of valve seat 3 may take, in part, the form of a raised seat ring 31. Typically made of rubber or other known elastomeric compound, the valve element 1 takes the form of a disk-shaped body whose width depends on the particular type of valve device at issue. Molded into the valve element is a metal (e.g., brass) insert 40 to endow the otherwise soft disk 1 with high degree of stiffness and strength. Projecting from the periphery of the elastomeric disk 1 is thus a plurality of metal prongs 5 so as to give the valve element 1 a fluted periphery, as best shown in FIG. 1A. The prongs thus aid the flow of air through the valve device. By these prongs, the valve element 1 is also guided in its movement within the main bore of the valve chamber 4. Formed at, or otherwise attached to, the seat facing side of the disk 1 is the valve head 10. The non-seat facing side of the disk typically takes the form of a short shaft or protuberance 11, as shown in FIG. 1. Typically held in compression between the non-seat facing side of the valve head 10 and a spring stop formed at one end of its bore in the valve housing, the spring 2 surrounds the protuberance 11. The spring 2 may also be held in compression between a snap ring secured to the cylindrical wall of its bore and the non-seat facing side of the valve head 10. The main bore of valve chamber 4 and the valve spring 2 together act as a guide to assure proper alignment of the valve head 10 with the valve seat 3. It is the valve spring 2 that provides the bias necessary to keep the valve head 10 in its normally closed position against the raised seat ring 31 of valve seat 3.

Shown in FIG. 2 is another type of prior art check valve device. This valve device is similar to that shown in FIG. 1 except for the structure of the valve element 1 and the valve seat 3. Specifically, the valve seat 3 features a flat rigid annular surface 32 rather than the raised ring seat 31 illustrated in FIG. 1. Correspondingly, the valve element 1 features a raised sealing ring 12 formed on the seat facing side of its valve head 10 rather than the flat sealing surface depicted in FIG. 1. Like the valve device shown in FIG. 1, the valve element 1 contains the metal insert 40. The valve element 1 is thus fluted in its periphery as it has the plurality of metal prongs 5 along its periphery, as shown in FIG. 2A. The main bore of chamber 4 and the valve spring 2 together act as a guide to assure proper alignment of the valve head 10 with the valve seat 3. The valve spring 2, of course, provides the bias necessary to keep the raised sealing ring 12 of valve head 10 in its normally closed position against the flat annular surface 32 of valve seat 3, as shown in FIG. 2.

Another type of prior art check valve device is illustrated in FIG. 3. This valve device features a valve element comprised of a circular elastomeric disk 50 and a molded plastic housing 60 in which the elastomeric disk 50 is housed. Akin to the metal insert 40 of the previously described valve devices, the plastic housing 60 provides stiffness to, strengthens and otherwise supports the soft elastomeric disk 50 so that it can resist deformation and otherwise withstand the stresses of the environment in which the valve element is used. Projecting from the periphery of the plastic housing 60 is a plurality of prongs 5. The prongs give the valve element a fluted periphery, as shown in FIG. 3A, and aid the flow of air through the valve device when the valve element, by the seat facing side of the elastomeric disk 50, is unseated from valve seat 3. It is also by these prongs that the valve element is guided in its movement within the main bore of valve chamber 4. Projecting from the surface 30 of valve seat 3 is a raised seat ring 31, as shown in FIG. 3. The valve spring 2 provides the bias necessary to keep the valve element in its normally closed position wherein the elastomeric disk 50 is sealingly positioned against the raised seat ring 31 of valve seat 3.

Referring now to the poppet type valve device shown in FIG. 4, this valve device features a valve element 1, a valve spring 2 and a valve seat 3 all within the chamber 4 defined in the housing of the valve device. The valve element 1 is comprised of a metal valve member 17 and an annular elastomeric seal 18. Projecting from the periphery of the metal valve member 17 is a plurality of prongs (not shown). As known to those skilled in the art of making valves, this gives the valve element a fluted periphery and aids in the flow of air through the valve device. The metal valve member 17 is typically made of brass, and defines an annular recess in its flat bottom surface 19. Molded into this annular recess is the annular elastomeric seal 18. The valve seat 3 features a raised seat ring 31. The valve spring 2 provides the bias necessary to keep the valve element 1 in its normally closed position wherein the annular elastomeric seal 18 is sealingly engaged against the raised seat ring 31 of valve seat 3. The poppet valve device further includes a piston actuated stem 70. One end of stem 70 is disposed in the lower channel with its head end opposite the center part of bottom surface 19 of metal valve member 17. An o-ring 71 is disposed in an annular recess defined in the cylindrical wall of stem 70. This o-ring prevents leakage of air from the valve device when the stem 70 is piston actuated further into the lower channel to unseat the valve element 1 from the raised seat ring 31 of valve seat 3.

Check and poppet type valve devices range from simple to complex in design. Quite often they must be manufactured to rather exacting dimensions so as to assure proper control and/or containment of air in systems that require relatively high operating pressure(s). Consequently, abutting valve surfaces must often be carefully machined so that the valve device when closed can provide an air tight seal between the corresponding surfaces of the valve element and the valve seat.

To resist deformation and otherwise withstand the stresses of the environment in which they are used, valve elements have traditionally been made so that they possess a high degree of stiffness and strength. Manufacturers such as WABCO, for example, have molded into their elastomeric valve elements 1, such as the ones shown in FIGS. 1 and 2, a brass insert 40 to endow the otherwise soft valve elements 1 with these characteristics. U.S. Pat. Nos. 5,213,749 and 5,303,937, assigned to WABCO and incorporated herein by reference, teach yet another type of prior art elastomeric valve element 41 into which a metal insert 61 has been molded.

There are several shortcomings inherent to check and poppet valve devices of the type that employ the soft valve elements 1 shown in FIGS. 1 and 2. The various prior art processes by which such stiffened valve elements are made are quite complex. During manufacturing, for example, the brass insert must be carefully loaded into, and positioned within, the mold so that the rubber or like compound can properly flow and form around the metal insert. Subsequent to the molding process, the flashing that is commonly produced during the molding operation must also be removed. These tasks add cost to both the manufacturing and quality control processes. Consequently, various alternatives to the use of brass inserts have been investigated, such as using a molded plastic housing 60 as a carrier for the type of sealing element 50 shown in FIG. 3. This type of housing provides the necessary rigidity and strength to the elastomeric sealing element. Unfortunately, the molded plastic housing option and various other alternatives, such as the one shown in FIG. 4, have also proven to be unduly complex and/or costly to implement.

The foregoing background information is provided to assist the reader to understand the invention described and claimed below. Accordingly, any terms used herein are not intended to be limited to any particular narrow interpretation unless specifically stated otherwise in this document.

OBJECTIVES OF THE INVENTION

It is, therefore, a primary objective of the invention to provide an improved check/poppet type valve device that is considerably easier to manufacture and less expensive than check/poppet valve devices currently known.

Another objective is to provide a check or poppet valve device whose resilient sealing element does not require a metal insert to be molded into it or bonded to it.

Yet another objective is to provide a check/poppet valve device whose construction employs use of a tubular sleeve to retain a resilient ring seal atop an annular valve seat by which the necessary airtight seal between the valve head and the valve seat is provided when the valve device is closed.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

In a first presently preferred embodiment, the invention provides a check valve device for use with a pneumatic system. The check valve device comprises a valve housing, a valve seat, a resilient ring seal, a retaining sleeve, a valve member and a valve spring. The valve housing defines an inlet channel, an outlet channel and at least one valve bore through which the inlet and outlet channels interconnect. Formed in the valve bore is the valve seat. The valve seat has a generally flat annular surface from within which an opening emerges into a preferred one of the two channels. The resilient ring seal is situated atop, and is coaxial with the opening defined by, the flat annular surface of the valve seat. The resilient ring seal has an outer periphery that abuts against an interior cylindrical wall of the valve bore. Situated within the valve bore, the retaining sleeve has an outer cylindrical wall that abuts against the interior cylindrical wall of the valve bore. It also has a bottom that sits atop a peripheral portion of the resilient ring seal thereby sealingly retaining the resilient ring seal against the flat annular surface of the valve seat. Preferably fluted, the valve member is moveable within this retaining sleeve. By its head portion at one end, the valve member is adapted to be pressed atop and against, and form a leak-proof seal with, an inner portion of the resilient ring seal. Compressively disposed within the valve bore against a non-seat facing side of the valve member, the valve spring compels the head portion of the valve member against the resilient ring seal. The check valve device is thus normally biased in a closed position wherein the preferred channel is cut-off from the valve bore of the valve housing.

DETAILED DESCRIPTION OF THE INVENTION

Figure 1:
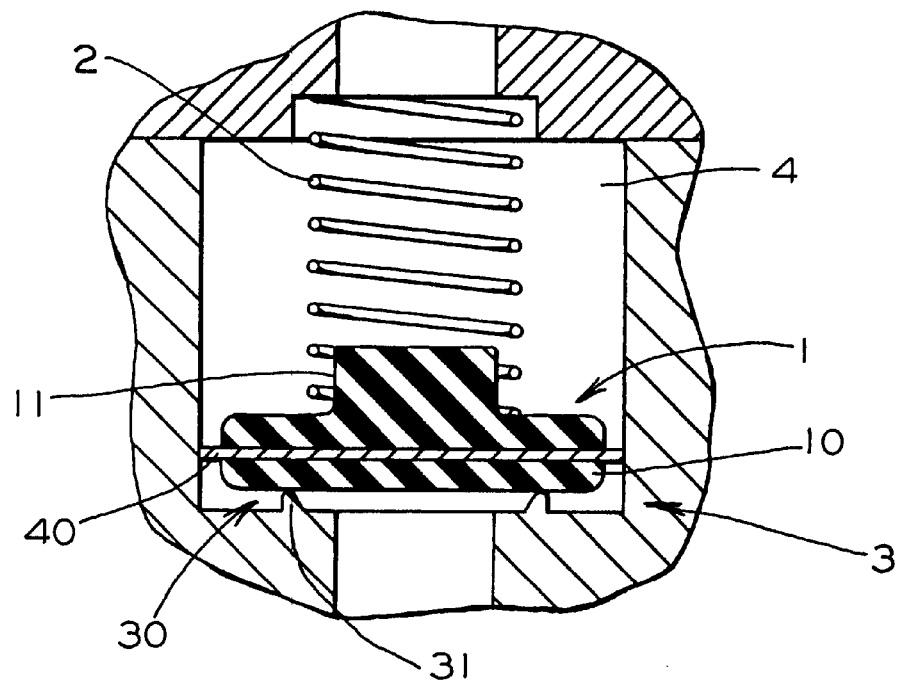
FIG. 1 is a cross-sectional view of a prior art check valve that features an elastomeric valve element into which a metal insert has been molded.
Figure 1A:
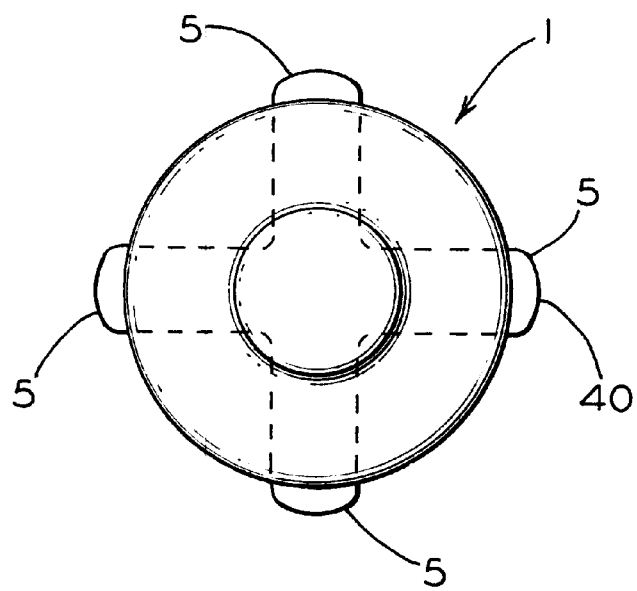
FIG. 1A is a top view of the elastomeric valve element shown in FIG. 1 better illustrating the metal insert.
Figure 2:
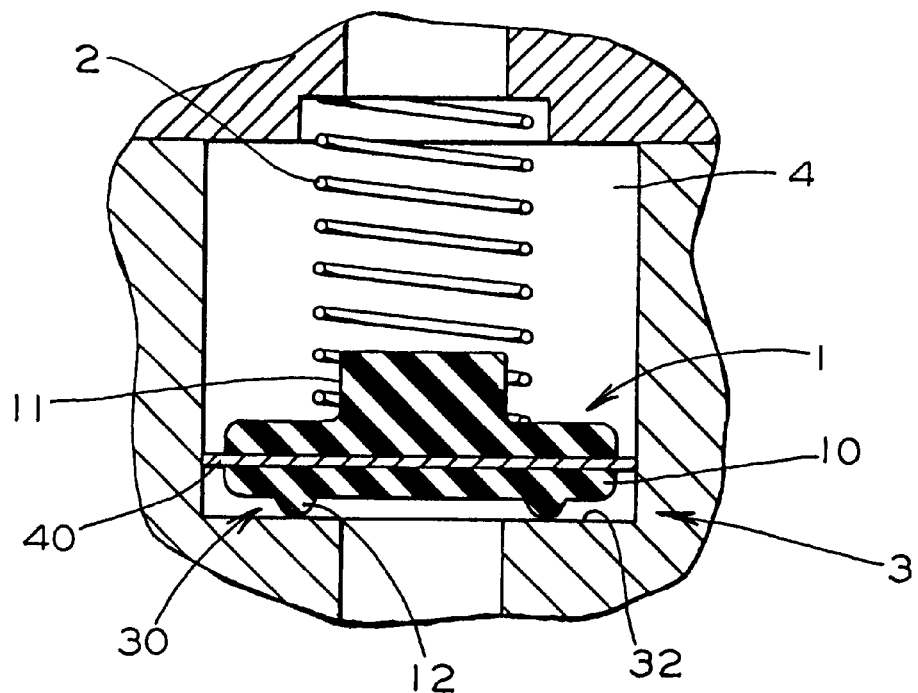
FIG. 2 is a cross-sectional view of a prior art check valve that features a different type of elastomeric valve element into which a metal insert has been molded.
Figure 2A:
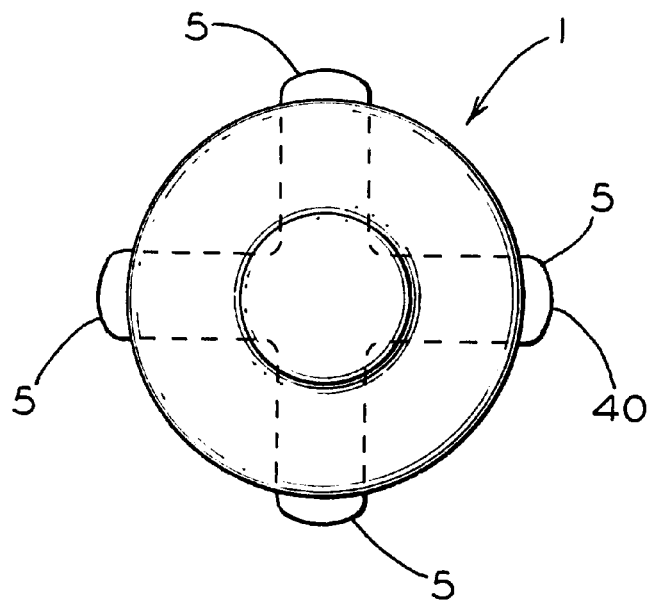
FIG. 2A is a top view of the elastomeric valve element shown in FIG. 2 better illustrating the metal insert.
Figure 3:
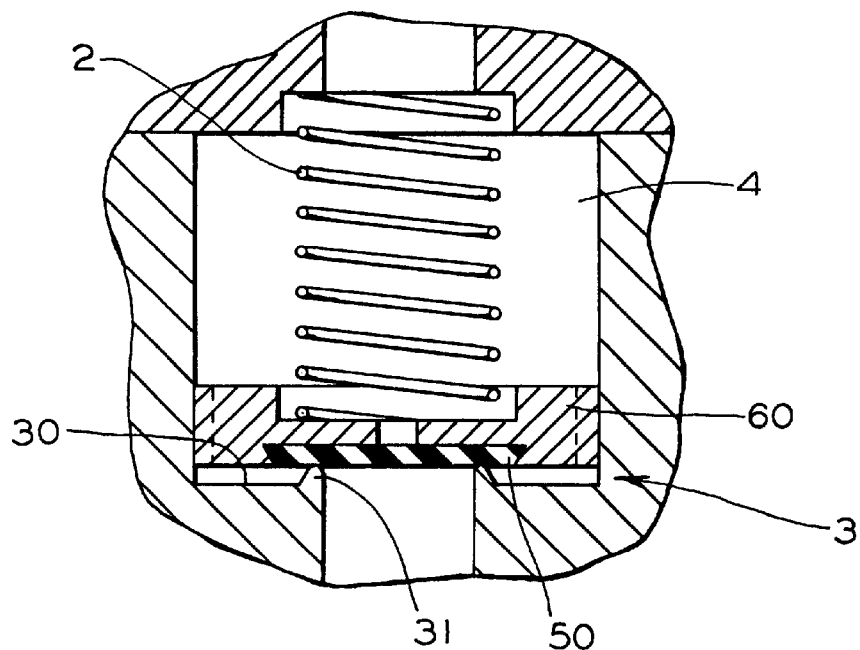
FIG. 3 is a cross-sectional view of a prior art check valve that features a valve element comprised of a molded plastic housing in which an elastomeric sealing disk is housed.
Figure 3A:
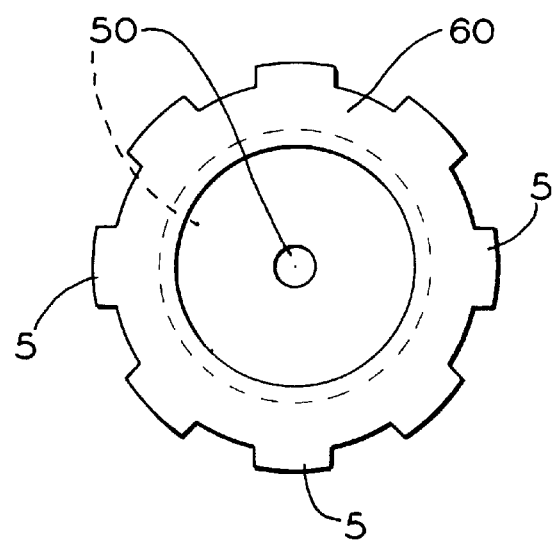
FIG. 3A is a top view of the valve element illustrated in FIG. 3.
Figure 4:
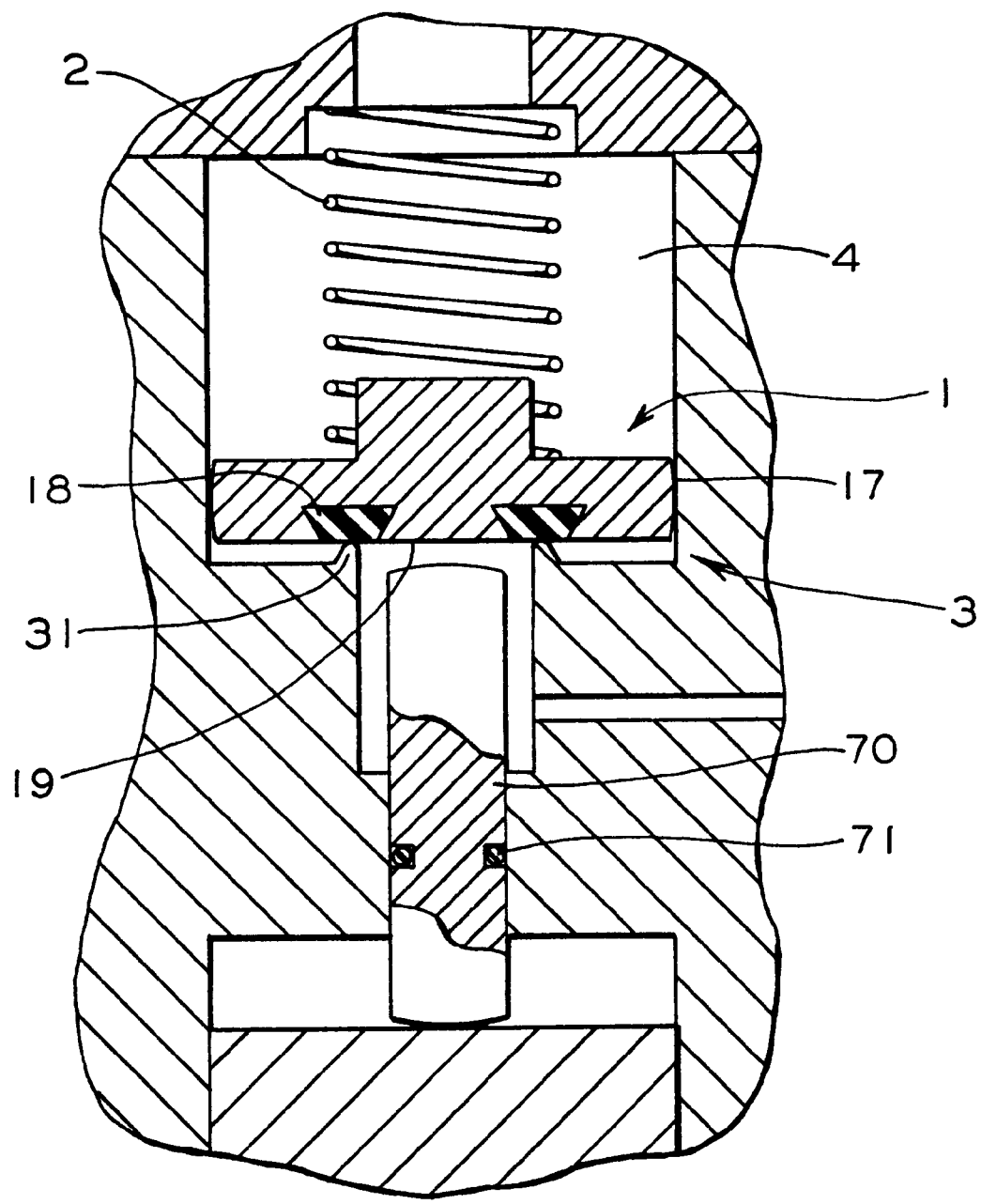
FIG. 4 is a cross-sectional view of a prior art poppet valve having a valve element comprised of a metal member in whose bottom surface an annular elastomeric seal is housed.
Figure 5:
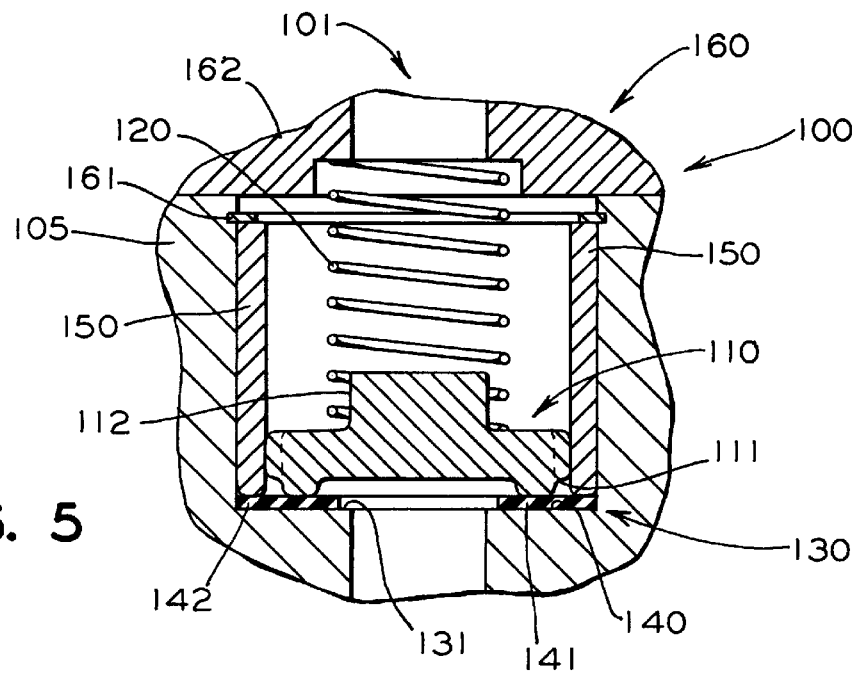
FIG. 5 is a cross-sectional view of a check or poppet type valve according to the invention.

FIG. 5 illustrates the essential details of a presently preferred embodiment of a check/poppet type valve device 100. The check/poppet valve device 100 includes a valve member 110, a valve spring 120, a valve seat 130, a resilient ring seal 140 and a retaining sleeve 150, all of which housed within a chamber 101 defined in the housing 105 of the valve device 100. The housing 105 of the valve device 100 also defines an inlet channel and an outlet channel by which the valve device 100 pneumatically connects to or within the pneumatic system with which it is used. The valve chamber 101 is composed of one or more contiguous bores drilled into or otherwise formed in the valve housing 105, as is clear from FIG. 5. It is through this valve chamber 101 that the inlet and outlet channels interconnect.

The valve member 110 may take the form of a disk-shaped body, and may be composed of metal, such as aluminum, or of a plastic compound via a molding process. It may also be made of any number of other suitable materials all of which well known in the pneumatic and hydraulic arts. The width of the disk-shaped valve member 110 can be tailored to the demands of the environment in which the invention will be used. Formed at, or otherwise attached to, the seat facing side of the valve member is the head portion 111. The non-seat facing side of valve member 110 typically takes the form of a short shaft or protuberance 112. The valve seat 130 features a flat rigid annular surface 131 within which is defined an opening from which a preferred one of the inlet and outlet channels emerges.

Composed of rubber or other suitable elastomeric material of a type well known in the pneumatic and hydraulic arts, the resilient ring seal 140 is situated atop, and is generally coaxial with the opening defined by, the flat annular surface 131 of valve seat 130. Optionally, adjacent this flat annular surface within the cylindrical inside wall of the main bore, there can be formed an annular recess (not shown) adapted to contain an outermost ring (not shown) of resilient seal 140. By its head portion 111 at one end, the valve member 110 is adapted to be pressed against, and form a leak-proof seal with, an inner portion 141 of resilient ring seal 140.

Preferably situated within the main valve bore is the retaining sleeve 150. Ideally, the retaining sleeve 150 is tubular or cylindrical in shape and is disposed concentrically within the cylindrical inside wall of the main bore of valve housing 105. Moveable within the retaining sleeve 150 is, of course, the valve member 110. Situated near an end of a preferred one of the valve bores, a retaining means 160 is used to clamp the retaining sleeve 150 in the main bore between it and a peripheral portion 142 of resilient ring seal 140. The retaining means 160 may also be used to hold the valve spring 120 in compression between it and the non-seat facing side of the valve member 110.

The retaining means 160 may be implemented in any number of ways well known to those skilled in the art of making pneumatic and hydraulic valves. For example, the retaining means 160 may take the form of a snap ring 161 attachable to a cylindrical inside wall of the one of the valve bores. The snap ring 161 may be secured within the cylindrical wall using known prior art practice such as by snapping it into a groove defined in the wall. Alternatively, the retaining means 160 may take the form of a cover 162 for the valve device 100. The cover 162 may be secured onto the top of valve device 100 using known prior art practice such as by adhesive, welding, or snaps.

Disposed in the aforementioned manner within valve chamber 101, the retaining sleeve 150 provides the requisite clamping load to hold the resilient ring seal 140 firmly in place. The retaining sleeve 150 thus enables ring seal 140 to provide an airtight seal along its periphery against the flat annular surface 131 of valve seat 130. The retaining sleeve 150 further enables the resilient ring seal 140 to resist deformation and otherwise withstand the stresses of the environment in which it will be used. Employed in this manner with retaining sleeve 150 and retaining means 160, the resilient ring seal 140 possesses a high degree of stiffness and strength.

As illustrated in FIG. 5, the valve spring 120 at its lower end preferably surrounds the protuberance 112 on the non-seat facing side of valve member 110. The retaining sleeve 150 and the valve spring 120 thus together act as a guide to assure alignment of the head portion 111 of valve member 110 with the valve seat 130. Compressively disposed within its bore between the retaining means 160 and the non-seat facing side of valve member 110, it is the valve spring 120 that compels the head portion 111 of valve member 110 against the resilient ring seal 140. In this manner, the check/poppet valve device 100 is biased in a closed position wherein the preferred channel is cut-off from the main bore of valve housing 105.

Figure 5A:
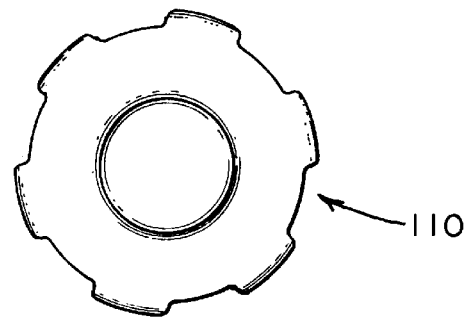
FIG. 5A is a top view of a valve element for a check or poppet type valve device according to the invention.
Figure 5B:
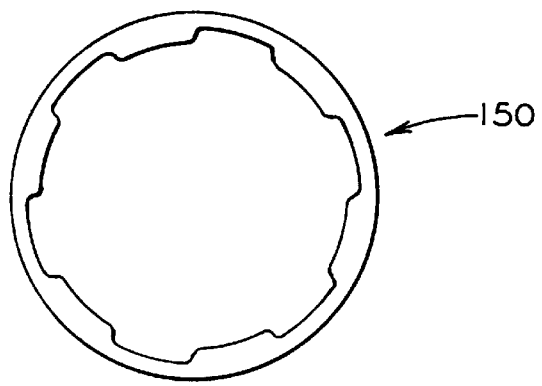
FIG. 5B is a top view of a retaining sleeve for a check or poppet type valve device according to the invention.

Referring now to FIG. 5A, the periphery of valve member 110 is fluted so as to further aid the flow of air through valve chamber 101 when the valve device 100 is placed in the open position. From the perspective of FIG. 5, in the open position, the valve member 110 is moved upwardly thereby forcibly unseating the head portion 111 from the resilient ring seal 140 against the compressive force of spring 120. Alternatively, the retaining sleeve 150 may be fluted to accomplish the same purpose. This is shown in FIG. 5B.

The presently preferred embodiment of the check/poppet valve invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

What is claimed is:

1. A check valve device comprising:

(a) a valve housing defining an inlet channel, an outlet channel and at least one valve bore through which said inlet and outlet channels interconnect;

(b) a valve seat, formed in said least one valve bore, having a generally flat annular surface from within which an opening emerges into a preferred one of said channels;

(c) a resilient ring seal situated atop said flat annular surface of said valve seat and coaxially with said opening, said resilient ring seal having an outer periphery that abuts against an interior cylindrical wall of said at least one valve bore;

(d) a retaining sleeve situated within said at least one valve bore, said retaining sleeve having (i) an outer cylindrical wall that abuts against said interior cylindrical wall of said at least one valve bore and (ii) a bottom that sits atop a peripheral portion of said resilient ring seal thereby sealingly retaining said resilient ring seal against said flat annular surface of said valve seat;

(e) a valve member moveable within said retaining sleeve, said valve member having at one end thereof a head portion adapted to be pressed atop and against and form a leak-proof seal with an inner portion of said resilient ring seal that is so retained atop said flat annular surface of said valve seat;

(f) a valve spring disposed compressively within said at least one valve bore against a non-seat facing side of valve member so as to bias said valve member via said head portion thereof against said resilient ring seal thereby biasing said valve member in a closed position wherein said preferred channel is cut-off from said at least one valve bore of said valve housing; and (g) a means for retaining said retaining sleeve and said valve spring within said at least one valve bore of said valve housing.

2. The check valve device as recited in claim 1 wherein said resilient ring seal is composed at least partly of a rubber like compound.

3. The check valve device as recited in claim 1 wherein said retaining sleeve is tubular in shape and disposed concentrically within a cylindrical inside wall of said at least one valve bore.

4. The check valve device as recited in claim 1 wherein said retaining sleeve is fluted in its interior.

5. The check valve device as recited in claim 1 wherein said retaining means includes a snap ring attachable to a cylindrical inside wall of said at least one valve bore by which to retain (i) said retaining sleeve between said snap ring and said peripheral portion of said resilient ring seal and (ii) said valve spring between said snap ring and said non-seat facing side of valve member.

6. The check valve device as recited in claim 1 wherein said retaining means includes a cover for said check valve device attachable to a top of said at least one valve bore by which to retain (i) said retaining sleeve between said cover and said peripheral portion of said resilient ring seal and (ii) said valve spring between said cover and said non-seat facing side of valve member.

7. The check valve device as recited in claim 1 wherein said valve member is composed of molded plastic.

8. The check valve device as recited in claim 1 wherein said valve member is composed of metal.

9. The check valve device as recited in claim 8 wherein said valve member is composed of aluminum.

10. The check valve device as recited in claim 1 wherein said valve member is fluted in its periphery.

11. An improvement to a check/poppet valve device of the type having (i) a valve housing defining an inlet channel, an outlet channel and at least one valve bore through which said inlet and outlet channels interconnect, (ii) a valve seat, formed in said least one valve bore, having a flat annular surface from within which an opening emerges into a preferred one of said channels, (iii) a valve member having at one end a head portion adapted to be pressed against said flat annular surface of said valve seat, and (iv) a valve spring disposed compressively within said at least one valve bore against a non-seat facing side of said valve member so as to bias said valve member via said head portion thereof against said flat annular surface of said valve seat, said improvement comprising:

(a) a resilient ring seal situated atop said flat annular surface of said valve seat and coaxially with said opening, said resilient ring seal having an outer periphery that abuts against an interior cylindrical wall of said at least one valve bore, said head portion of said valve member adapted to be pressed atop and against and form a leak proof seal with an inner portion of said resilient ring seal; and (b) a retaining sleeve within which said valve member is moveable, said retaining sleeve secured within said at least one valve bore and having (i) an outer cylindrical wall that abuts against said interior cylindrical wall of said at least one valve bore and (ii) a bottom that sits atop a peripheral portion of said resilient ring seal thereby sealingly retaining said resilient ring seal against said flat annular surface of said valve seat; said valve spring biasing said head portion of said valve member against said resilient ring seal thereby biasing said valve member in a closed position wherein said preferred channel is cut-off from said at least one valve bore of said valve housing.

12. The improved check/poppet valve device as recited in claim 11 wherein said resilient ring seal is composed at least partly of a rubber like compound.

13. The improved check/poppet valve device as recited in claim 11 wherein said retaining sleeve is tubular in shape and disposed concentrically within a cylindrical inside wall of said at least one valve bore.

14. The improved check/poppet valve device as recited in claim 11 wherein said retaining sleeve is fluted in its interior.

15. The improved check/poppet valve device as recited in claim 11 wherein said retaining sleeve is secured, and said valve spring is compressively disposed, within said at least one valve bore by a snap ring attachable to a cylindrical inside wall of said at least one valve bore with (i) said retaining sleeve between said snap ring and said peripheral portion of said resilient ring seal and (ii) said valve spring between said snap ring and said non-seat facing side of valve member.

16. The improved check/poppet valve device as recited in claim 11 wherein said retaining sleeve is secured, and said valve spring is compressively disposed, within said at least one valve bore by a cover for said valve device attachable to a top of said at least one valve bore with (i) said retaining sleeve between said cover and said peripheral portion of said resilient ring seal and (ii) said valve spring between said cover and said non-seat facing side of valve member.

17. The improved check/poppet valve device as recited in claim 11 wherein said valve member is composed of molded plastic.

18. The improved check/poppet valve device as recited in claim 11 wherein said valve member is composed of metal.

19. The improved check/poppet valve device as recited in claim 18 wherein said valve member is composed of aluminum.

20. The improved check/poppet valve device as recited in claim 11 wherein said valve member is fluted in its periphery.

* * * * *